United States Patent
Semper et al.

(10) Patent No.: US 7,773,997 B2
(45) Date of Patent: Aug. 10, 2010

(54) SYSTEM AND METHOD FOR CONTROLLING QUALITY OF SERVICE IN A WIRELESS NETWORK

(75) Inventors: William J. Semper, Richardson, TX (US); Purva R. Rajkotia, Plano, TX (US)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 2025 days.

(21) Appl. No.: 10/620,402

(22) Filed: Jul. 16, 2003

(65) Prior Publication Data

US 2005/0014509 A1    Jan. 20, 2005

(51) Int. Cl.
*H04Q 7/20* (2006.01)

(52) U.S. Cl. .................. 455/452.2; 455/452.1; 455/450; 455/451; 370/328; 370/230; 370/236; 370/252; 370/395.21

(58) Field of Classification Search ............... 370/452.2, 370/353, 229, 338, 328, 395, 230, 236, 252, 370/332, 238, 352, 468, 395.21, 395.2, 395.43; 455/450–451, 452.2–452.5

See application file for complete search history.

(56) References Cited

U.S. PATENT DOCUMENTS

| | | | |
|---|---|---|---|
| 6,608,832 B2 * | 8/2003 | Forslow | 370/353 |
| 6,665,293 B2 * | 12/2003 | Thornton et al. | 370/352 |
| 6,690,651 B1 * | 2/2004 | Lamarque et al. | 370/252 |
| 6,711,141 B1 * | 3/2004 | Rinne et al. | 370/328 |
| 6,735,175 B1 * | 5/2004 | Havens | 370/236 |
| 6,879,834 B2 * | 4/2005 | Virtanen | 455/452.2 |
| 6,934,258 B1 * | 8/2005 | Smith et al. | 370/238 |
| 6,940,836 B2 * | 9/2005 | Borella et al. | 370/331 |
| 7,006,472 B1 * | 2/2006 | Immonen et al. | 370/332 |
| 7,024,202 B2 * | 4/2006 | Besset-Bathias et al. | 455/452.2 |
| 7,336,632 B2 * | 2/2008 | Cheng et al. | 370/329 |
| 7,408,940 B2 * | 8/2008 | Jin et al. | 370/395.21 |
| 7,573,906 B2 * | 8/2009 | Adamczyk et al. | 370/468 |
| 2001/0012777 A1 * | 8/2001 | Igarashi et al. | 455/435 |
| 2002/0114305 A1 * | 8/2002 | Oyama et al. | 370/338 |
| 2003/0095527 A1 * | 5/2003 | Shanbhag | 370/338 |
| 2003/0103454 A1 * | 6/2003 | Wahl et al. | 370/229 |
| 2003/0129988 A1 * | 7/2003 | Lee et al. | 455/450 |
| 2003/0137944 A1 * | 7/2003 | Medvinsky | 370/252 |
| 2003/0140131 A1 * | 7/2003 | Chandrashekhar et al. | 709/223 |
| 2003/0161323 A1 * | 8/2003 | Harada et al. | 370/395.21 |
| 2005/0055220 A1 * | 3/2005 | Lee et al. | 705/1 |

* cited by examiner

*Primary Examiner*—Charles N Appiah
*Assistant Examiner*—Michael T Vu

(57) ABSTRACT

A system and method for controlling Quality of Service (QoS) in a wireless network on a per-user basis. According to the preferred embodiment, each user will have a QoS profile, listing the levels of service he is authorized to receive. The RAN assigns radio and network resources for the user, based on the applications that the user is running and the user's profile. A QoS server in the base station controller manages user QoS. When the base station controller receives a packet data call from a mobile station, the QoS profile and the application type that the mobile station is executing will be used to determine QoS parameters for the user's call.

21 Claims, 3 Drawing Sheets

SYSTEM AND METHOD FOR CONTROLLING QUALITY OF SERVICE IN A WIRELESS NETWORK

TECHNICAL FIELD OF THE INVENTION

The present invention is directed, in general, to wireless network control and, more specifically, to quality of service in a wireless network.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

Wireless service providers also seek other ways of using the available spectrum as efficiently as possible. Quality of Service (QoS) is rapidly becoming a crucial element of wireless networks; the term refers to the ability of the service provider to deliver a certain level of transmission and reception quality to the application that the wireless user is running. This may involve different levels of bandwidth, latency, or transmission errors on the network and over-the-air connections that transport data between the mobile user and the content server servicing the application.

Different wireless applications require different QoS levels. For example, voice communications require relatively low-latency two-way communication. E-mail applications require less bandwidth and permit higher latency in data transmissions through the system. But, in general, e-mail applications require a low error rate in the delivery of the data (so that the integrity of the message is ensured) and, therefore, require re-transmissions of lost data packets. On the other hand, streaming audio or video requires a high-speed, low-latency data rate in one direction, but does not require re-transmission of lost packets.

Unfortunately, in conventional wireless networks, all mobile devices receive the same QoS, regardless of whether the applications being run by the user actually require a high level of QoS. Further, there is no means of communicating the user's application needs to the RAN. Users are scheduled for RAN resources on a first come/first served basis. This results in inefficient use of the available RF spectrum and bandwidth.

Therefore, there is a need in the art for a method for providing a system to customize and control Quality of Service on a per-use basis.

SUMMARY OF THE INVENTION

The preferred embodiment provides a system and method for controlling Quality of Service (QoS) in a wireless network, including not only the Radio Access Network (RAN) but also the over-the-air interface on a per-user basis. According to the preferred embodiment, each user will have a QoS profile, listing the levels of service he is authorized to receive. The RAN assigns radio and network resources for the user, based on the applications that the user is running and the user's profile. A QoS server in the base station controller manages user QoS.

When the base station controller establishes a packet data call from a mobile station, the QoS profile and the application type that the mobile station is executing will be used to determine QoS parameters for the user's call.

Therefore, to address the above-discussed deficiencies of the prior art, it is a primary object of the present invention to providese in a call management system comprising: a QoS controller capable of receiving from a mobile station a packet data call initiation signal and sending an authorization request corresponding to the mobile station to an authorization server, wherein the QoS controller receives from the authorization server an authorization message and quality-of-service profile corresponding to the mobile station, and wherein said QoS controller is further capable of receiving application information corresponding to the mobile station, determining quality-of-service parameters according to the quality-of-service profile and the application information, and transmitting a control message to the mobile station capable of causing the mobile station to communicate thereafter according to the quality-of-service parameters.

According to one embodiment of the present invention, the QoS controller is a part of a base station controller.

According to one embodiment of the present invention, the quality-of-service profile is stored on an authorization server.

According to another embodiment of the present invention, the quality-of-service parameters are sent to a packet data serving node.

According to still another embodiment of the present invention, the application information includes an application data class.

According to yet another embodiment of the present invention, the quality-of-service profile includes delay, maximum data rate, and data loss rate information.

According to a further embodiment of the present invention, the QoS controller determines the quality-of-service profile using a quality-of-service control component.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
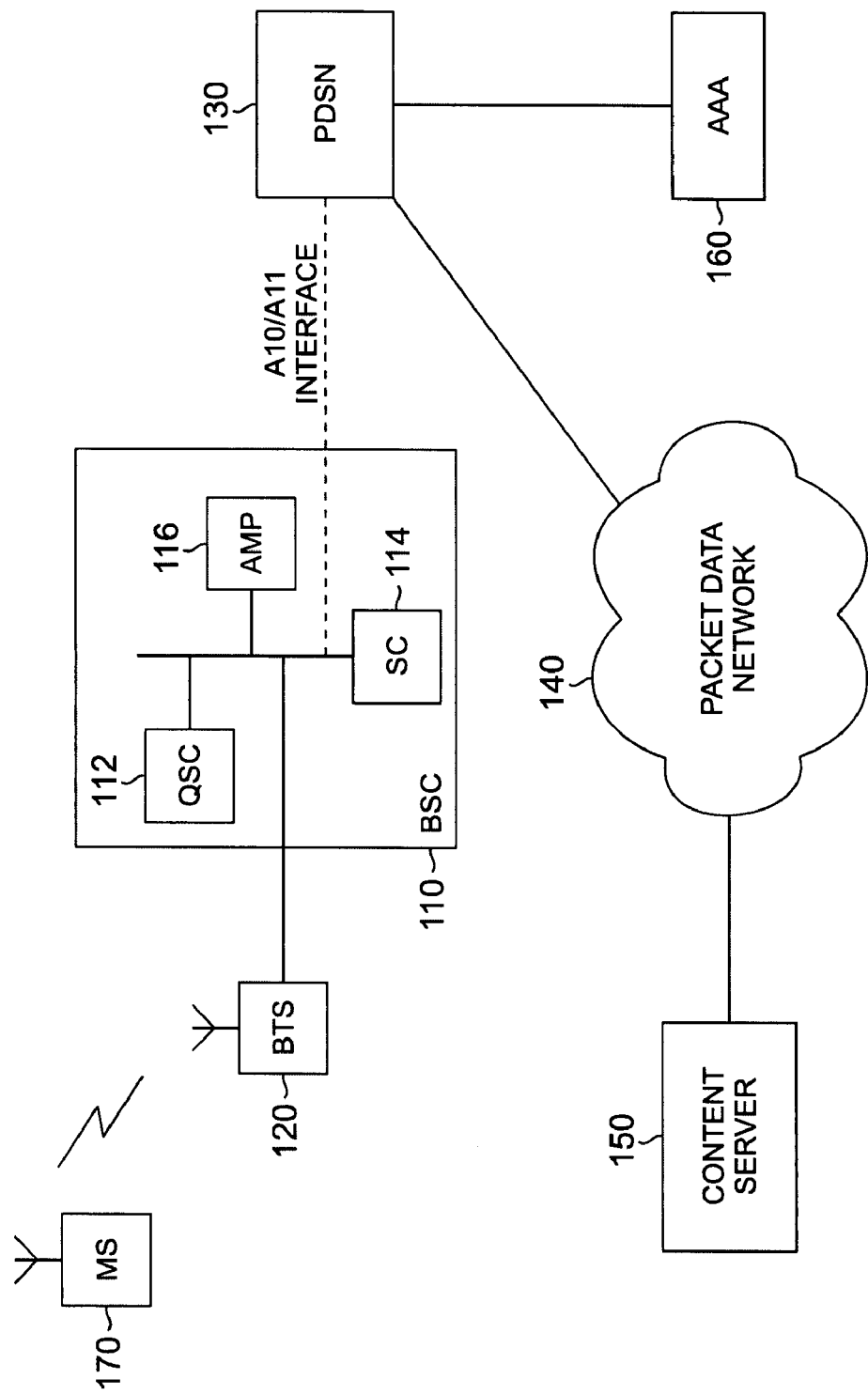
FIG. 1 depicts a block diagram of a wireless network system in accordance with a preferred embodiment of the preferred embodiment.
Figure 2:
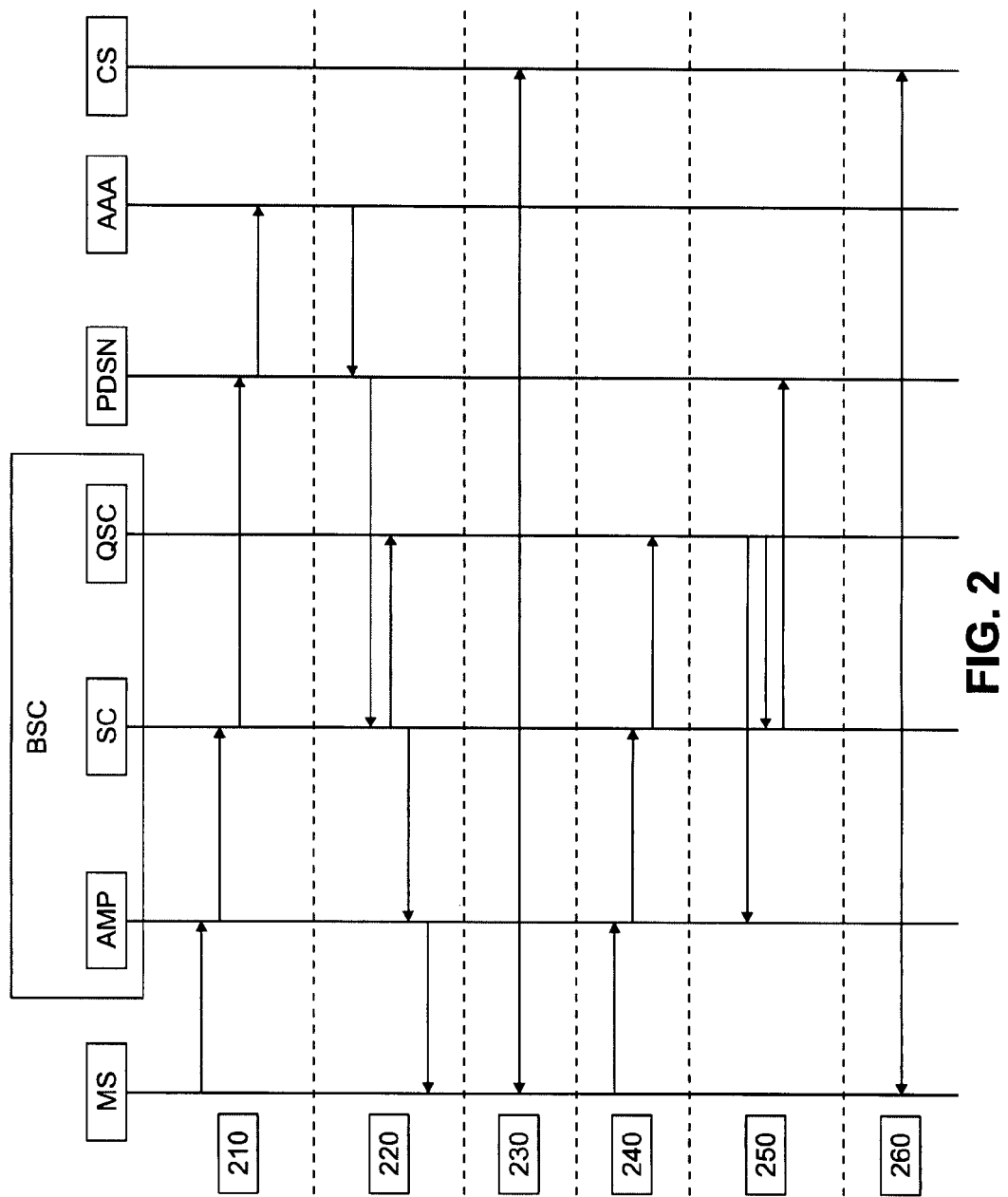
FIG. 2 depicts a data flow diagram of a process in accordance with the preferred embodiment.
Figure 3:
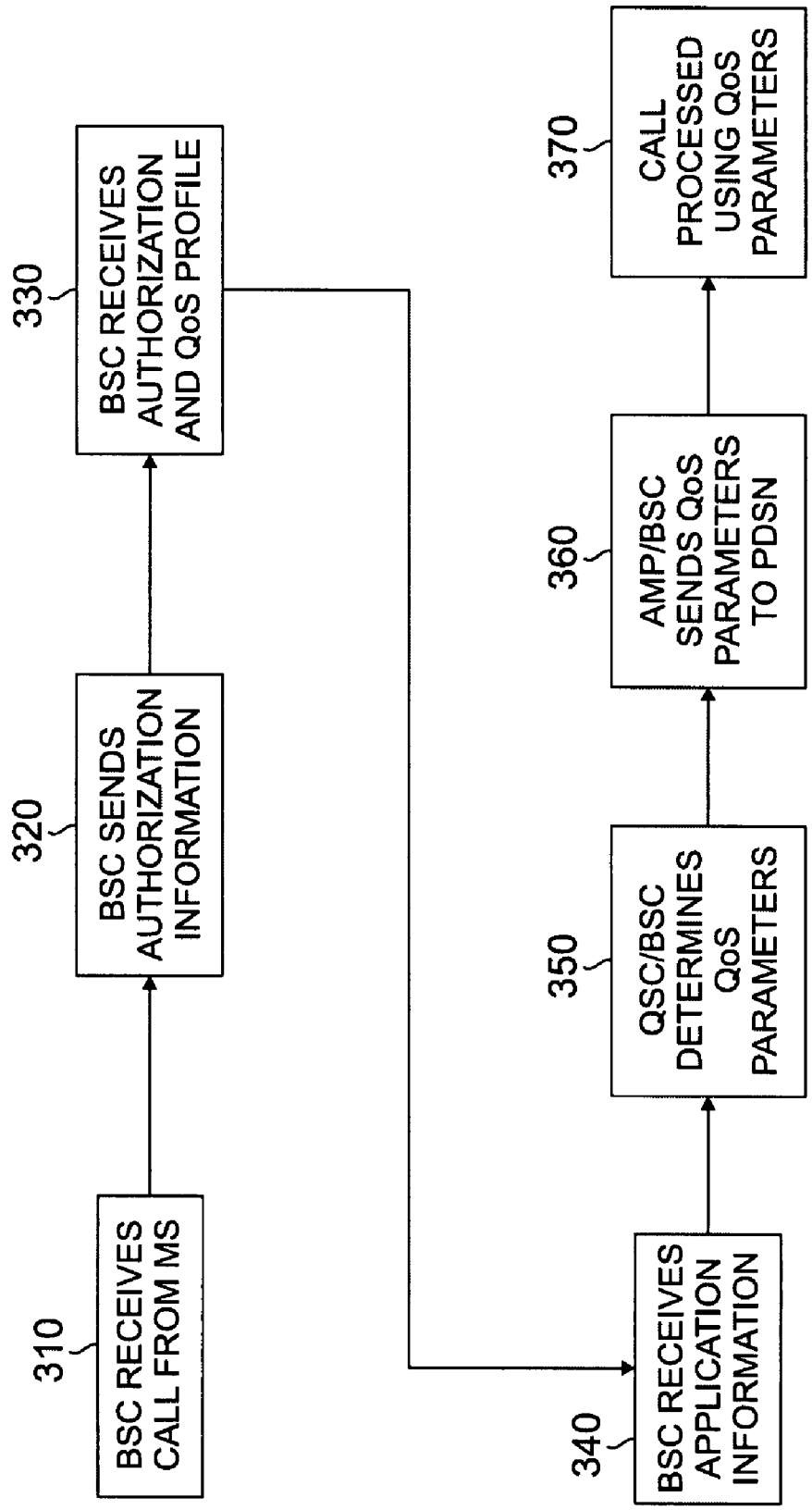
FIG. 3 depicts a process flow chart of a process in accordance with the preferred embodiment.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

This document contains many acronyms, specific hardware names, and other specialized terms relating to the area of wireless voice and data networks. While many of these terms are defined or specified herein, those terms that are not so defined are known to those of skill in the art.

The preferred embodiment provides a system and method for controlling Quality of Service (QoS) in a wireless network, including not only the Radio Access Network (RAN) but also the over-the-air interface on a per-user basis. According to the preferred embodiment, each user will have a QoS profile, listing the levels of service he is authorized to receive. The RAN assigns radio and network resources for the user, based on the applications that the user is running and the user's profile. A QoS server in the base station controller manages user QoS.

In this embodiment, each user has a profile listing the levels of service that he is authorized to receive; this profile is stored in the Authentication, Authorization, and Accounting (AAA) entity. The RAN assigns radio and network resources for the user, based on the applications that the user is running and the user's profile. The logical entity to oversee this service provisioning is the base station controller (BSC), which not only controls the air interface but also communicates with all entities in the RAN.

A QoS Controller (QSC) in the BSC receives the user's QoS profile, matches it against the user's current applications, and informs various elements in the RAN of the user's assigned QoS level. The QSC is responsible for provisioning levels of QoS for each user packed data call.

In the preferred embodiment, the QSC performs three primary functions. First, the QSC receives and stores the user's QoS profile when the initial packed data call is set up. The profile lists, for each type of traffic class, the values of Delay, Maximum Data Rate, and Data Loss Rate to which this particular user is entitled. Second, the QSC signals other entities in the BSC and RAN, indicating the QoS parameter values that the packet data call is now supporting. Third, with the addition of new user applications to the call, the QSC receives signaling from the mobile that indicates the traffic class of which the user would like the call to now be considered a part.

There are four traffic classes in the preferred embodiment: Conversational, Streaming, Interactive, and Background, as shown below:

| Class | Attributes of Class |
| --- | --- |
| Conversational | Two-way, low delay, low data loss rate, sensitive to delay variations. |
| Streaming | One way, less sensitive to delay, low data loss rate, may require high bandwidth. |
| Interactive | Two-way, bursty, variable bandwidth requirements, moderate delay, moderate data loss rate, correctable in part. |
| Background | Highly tolerant to delay and data loss rate has variable bandwidth. |

FIG. 1 depicts a block diagram of major portions of a wireless network system in accordance with the preferred embodiment. Other conventional portions of a wireless network, known to those of skill in the art, are not depicted here. Of course, the techniques and principles of the preferred embodiment are not limited to this exemplary system. Further, in FIG. 1, each block represents a logical entity in the network, and these entities may be software blocks or hardware entities, and are not limited to one or the other.

The wireless network system in FIG. 1 comprises base station controller (BSC) 110, base transceiver subsystem (BTS) 120, packet data serving node (PDSN) 130, packet data network 140 (e.g., the Internet), content server 150, and Authentication, Authorization, and Accounting (AAA) server 160. BSC 110 further comprises QoS controller (QSC) 112, signaling controller (SC) 114, and Air Message Processing (AMP) controller 116. Signaling controller (SC) 114 creates and/or processes air interface messages. AMP controller 116 performs functions such as Radio Link Protocol (RLP), buffering, and scheduling of air interface traffic channels (including specifically the Supplemental Channel).

BSC 110 is connected to packet data serving node (PSDN) 130 over an A10/A11 interface (as defined in TIA/EIA/IS-2001). PSDN 130 is connected to AAA server 160. PSDN 130 also connects the radio access network (RAN) to packet data network (PDN) 140. Mobile station (MS) 170 accesses content servers (e.g., CS 150) via PDN 140 once a packet data call is set up. Base transceiver subsystem (BTS) 120 receives signals from and transmits signals to MS 170. MS 170 may be any suitable wireless device, including a telephone, a PDA, a data processing system, and the like.

FIG. 2 depicts a message flow diagram of a process of a typical packet data call situation in accordance with the preferred embodiment. Messaging between BTS 120 and BSC 110 is not shown for simplicity.

Mobile station (MS) 170 establishes a 3G packet data call on BSC 110. When AAA server 160 authorizes the user, the QoS profile for MS 170 (i.e., user profile) is returned to BSC 110. Once the call is set up, MS 170 accesses CS 150 and initiates a service (e.g., streaming video).

Based on this service, MS 170 signals to BSC 110 the type of traffic class to which the packet data call now belongs (e.g. Streaming, as shown in the table above). QSC 112 indicates to AMP controller 116 and PDSN 130 the appropriate QoS values that should now be associated with the packet data connection.

Step 210: Mobile station 170 initiates a packet data call to the wireless network. BSC 110 establishes an A10 connection to PDSN 130 for this call, and in the process sends user authorization information to AAA server 160 (this signaling is detailed in TIA/EIA-2001). Note that there may also be signaling to the Mobile Switching Center (MSC) to authenticate MS 170. This signaling is not shown.

Step 220: AAA server 160 authorizes the user and returns the QoS profile for the user, including the allowed values for Maximum Data Rate, Delay, and Data Loss Rate for each of the four traffic classes. This information is returned (via PSDN 130) to BSC 110, where it is kept in QSC 112.

Step 230: The user accesses CS 150 on packet data network (PDN) 140 and establishes an application (e.g., streaming video).

Step 240: Based on the application in use, MS 170 selects a traffic type for the packet data connection (e.g., Streaming). This traffic type is signaled to BSC 110, and the information is passed to QSC 112. Referring to the QoS profile for MS 170, QSC 112 determines what values for the QoS parameters are permitted for this user for this traffic type.

Step 250: The QoS parameters are then passed to AMP controller 116, which uses the QoS parameters to adjust scheduling algorithms and RLP transmission parameters. The QoS parameters are also passed to SC 114, which forwards the parameters to PDSN 130. PDSN 130 can use these parameters to implement buffering rules for this particular packet data connection.

Step 260: Data exchanged between MS 170 and PDSN 130 now is subject to the QoS parameters in place for the packet data connection. For example, for a streaming video application, BSC 110 will ensure that a large enough Supplemental Channel data rate is provided and will not utilize RLP retransmissions. MS can now communicate with CS 150 according to the defined QoS parameters as specified by the user's application and the user's profile.

The preferred embodiment allows for RAN support of QoS on a per-user basis. In other words, the present invention allows the network to provide different levels of service depending on the application that the user is running. Note that if the user changes applications during the same packet data call, and these changes imply a change to the traffic type for the packet data call, this can be signaled to QSC 112 from MS 170 and the appropriate adjustments made to the RAN components that are supporting this packet data call. This allows for dynamic QoS changes during the packet call.

FIG. 3 depicts a flowchart of a process in accordance with the preferred embodiment. BSC 110 will receive a packet data call initiation signal from mobile station (MS) 170 (step 310). BSC 110 sends authorization information corresponding to mobile station 170 to AAA server 160 (step 320).

BSC 110 will receive an authorization message and a QoS profile corresponding to mobile station 170 from AAA server 160 (step 330). BSC 110 receives application information corresponding to an application being executed on mobile station 170 (step 340). The application information in the preferred embodiment is a traffic type as assigned above.

QSC 112, preferably as a part of BSC 110, then determines QoS parameters corresponding to the QoS profile and the application information and passes this information to AMP controller (step 350). AMP controller 116, preferably as a part of BSC 110, uses this information to determine air-interface parameters (bandwidth, error rates, buffering limits, etc.) and also passes the QoS parameters to PDSN 130 (step 360).

Thereafter, wireless communications to and from the mobile station are processed using the QoS parameters (step 370).

Those skilled in the art will recognize that, for simplicity and clarity, the full structure and operation of all data processing systems suitable for use with the present invention is not being depicted or described herein. Instead, only so much of a device as is unique to the present invention or necessary for an understanding of the present invention is depicted and described. The remainder of the construction and operation of the disclosed devices may conform to any of the various current implementations and practices known in the art.

Although an exemplary embodiment of the present invention has been described in detail, those skilled in the art will understand that various changes, substitutions, variations, and improvements of the invention disclosed herein may be made without departing from the spirit and scope of the invention in its broadest form.

What is claimed is:

1. For use in a wireless network, a method of providing quality-of-service (QoS) functions to a mobile station accessing the wireless network, the method comprising the steps of:
    receiving from the mobile station an initiation signal for a packet data call;
    sending an authorization request corresponding to the mobile station;
    receiving an authorization message and quality-of-service profile corresponding to the mobile station according to a level of service authorized for the mobile station;
    receiving information corresponding to a first application of the mobile station;
    determining quality-of-service parameters according to the quality-of-service profile and the first application information, the quality-of-service parameters used to process communication to the mobile station during the packet data call, wherein the quality-of-service parameters are changeable during the packet data call upon receipt of information corresponding to a second application of the mobile station.

2. The method of claim 1, wherein the packet data call initiation signal is received in a base station controller.

3. The method of claim 1, wherein the quality-of-service profile is stored on an authorization server.

4. The method of claim 1, wherein the quality-of-service parameters are sent to a packet data serving node.

5. The method of claim 1, wherein the first application information includes an application data class.

6. The method of claim 1, wherein the quality-of-service profile includes delay, maximum data rate, and data loss rate information.

7. The method of claim 1, wherein quality-of-service parameters are determined by a quality-of-service control component.

8. A call management system comprising:
    a QoS controller capable of receiving from a mobile station an initiation signal for a packet data call and sending an authorization request corresponding to the mobile station to an authorization server,
    wherein the QoS controller receives from the authorization server an authorization message and quality-of-service profile corresponding to the mobile station, and
    wherein said QoS controller is further capable of:
        receiving information corresponding to a first application of the mobile station,
        determining quality-of-service parameters according to the quality-of-service profile and the first application information, and transmitting a control message to the mobile station capable of causing the mobile station to communicate during the packet data call according to the quality-of-service parameters, wherein the quality-of-service parameters are changeable during the packet data call upon receipt of information corresponding to a second application of the mobile station.

9. The call management system of claim 8, wherein the QoS controller is a part of a base station controller.

10. The call management system of claim 8, wherein the quality-of-service profile is stored on an authorization server.

11. The call management system of claim 8, wherein the quality-of-service parameters are sent to a packet data serving node.

12. The call management system of claim 8, wherein the first application information includes an application data class.

13. The call management system of claim 8, wherein the quality-of-service profile includes delay, maximum data rate, and data loss rate information.

14. The call management system of claim 8, wherein the QoS controller determines the quality-of-service profile using a quality-of-service control component.

15. The wireless network of claim 8, wherein QoS controller determines the quality-of-service profile using a quality-of-service control component.

16. A wireless network comprising:
a plurality of base stations capable of communicating with a plurality of mobile station, wherein at least one of the plurality of base stations comprises:
a QoS controller capable of receiving from a mobile station an initiation signal for a packet data call and sending an authorization request corresponding to the mobile station to an authorization server,
wherein the QoS controller receives from the authorization server an authorization message and quality-of-service profile corresponding to the mobile station, and
wherein said QoS controller is further capable of:
receiving information corresponding to a first application of the mobile station,
determining quality-of-service parameters according to the quality-of-service profile and the first application information, and
transmitting a control message to the mobile station capable of causing the mobile station to communicate during the packet data call according to the quality-of-service parameters, wherein the quality-of-service parameters are changeable during the packet data call upon receipt of information corresponding to a second application of the mobile station.

17. The wireless network of claim 16, wherein the QoS controller is a part of a base station controller.

18. The wireless network of claim 16, wherein the quality-of-service profile is stored on an authorization server.

19. The wireless network of claim 16, wherein the quality-of-service parameters are sent to a packet data serving node.

20. The wireless network of claim 16, wherein the first application information includes an application data class.

21. The wireless network of claim 16, wherein the quality-of-service profile includes delay, maximum data rate, and data loss rate information.

* * * * *